(12) United States Patent
Kazmi et al.

(10) Patent No.: US 8,041,353 B2
(45) Date of Patent: Oct. 18, 2011

(54) SYSTEMS AND METHODS FOR AUTOMATICALLY DETERMINING THE GLOBAL CELL IDENTIFIER OF A NEIGHBORING CELL

(75) Inventors: Muhammad Kazmi, Bromma (SE); Walter Müller, Upplands Vasby (SE); Vera Vukajlovic, Stockholm (SE); Bengt Lindoff, Bjarred (SE); Martin Israelsson, Spanga (SE); Harald Kallin, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 465 days.

(21) Appl. No.: 12/349,016

(22) Filed: Jan. 6, 2009

(65) Prior Publication Data

US 2009/0176490 A1    Jul. 9, 2009

Related U.S. Application Data

(63) Continuation-in-part of application No. PCT/SE2008/050139, filed on Feb. 4, 2008.

(60) Provisional application No. 61/019,355, filed on Jan. 7, 2008.

(51) Int. Cl.
*H04W 4/00* (2009.01)

(52) U.S. Cl. ..... 455/434; 455/438; 455/437; 455/435.1; 455/435.2; 455/436

(58) Field of Classification Search .......... 455/434, 455/414, 561, 450, 435.1, 436, 437, 443, 455/444
See application file for complete search history.

(56) References Cited

U.S. PATENT DOCUMENTS

| 2005/0148368 | A1 | 7/2005 | Scheinert et al. | |
|---|---|---|---|---|
| 2009/0219905 | A1* | 9/2009 | Khandekar et al. | 370/338 |
| 2009/0316652 | A1* | 12/2009 | Agashe et al. | 370/331 |
| 2010/0124179 | A1* | 5/2010 | Lee et al. | 370/252 |

OTHER PUBLICATIONS

R2-074930, "Mechanism for UE measurements and reporting of global cell identity", 3GPP TSG-RAN WG2 #60, Cheju, Korea, Nov. 5-9, 2007, Ericsson, Retrieved from the Internet on Nov. 24, 2008.
S5A071030, "Requirements for Automatic Neighbour Relation Lists", 3GPP TSG-SA5, Meeting SA5 Ad-Hoc LTE Meeting, Oct. 17-19, 2007, Hong Kong, China, Meeting SA5#56, Oct. 22-26, 2007, Guangzhou, China, Ericsson, Retrieved from the Internet on Nov. 24, 2008.
International Search Report and Written Opinion issued in International Application No. PCT/SE2008/050139, dated Nov. 25, 2008, 12 pages.

* cited by examiner

*Primary Examiner* — David Q Nguyen
(74) *Attorney, Agent, or Firm* — Rothwell, Figg, Ernst & Manbeck, P.C.

(57) ABSTRACT

The present application discloses systems and methods for automatically adding a unique identifier associated with a cell to a neighbor cell list associated with another cell. In some embodiments, the method includes: selecting a particular mobile terminal from a set of mobile terminals; instructing the particular mobile terminal to obtain and report the unique identifier; receiving from the particular mobile terminal the unique identifier; and adding the unique identifier to the neighbor cell list, wherein the step of selecting the particular mobile terminal from the set of mobile terminals comprises determining which of the mobile terminals in the set appears to have a relatively high probability of obtaining the unique identifier within a certain window of time and selecting that mobile terminal.

20 Claims, 11 Drawing Sheets

SYSTEMS AND METHODS FOR AUTOMATICALLY DETERMINING THE GLOBAL CELL IDENTIFIER OF A NEIGHBORING CELL

The present application claims the benefit of U.S. provisional patent application No. 61/019,355, filed on Jan. 7, 2008; and the present application is a continuation-in-part of PCT/SE2008/050139, filed on Feb. 4, 2008. The above mentioned provisional patent application and international patent application are hereby incorporated herein by this reference.

TECHNICAL FIELD

The present invention relates to the field of mobile networks. More specifically, the present invention relates to systems and methods for automatically determining the global cell identifier (GCI) of a neighboring cell.

BACKGROUND

Generally, a mobile network is comprised of many base stations and each base station may serve one or more cells. Each cell in a mobile network may be associated with two identifiers: (1) a physical layer cell identifier (PCI) and (2) a global cell identifier (GCI). Because the number of PCIs is limited, PCIs are not globally unique. That is, it is possible that two cells within a given mobile network (e.g., a public land mobile network (PLMN)) may have the same PCI. On the other hand, GCIs are globally unique. That is, for example, no two cells within a PLMN will have the same GCI.

Each cell in the mobile network may have multiple neighbors. For each particular cell, it is advantageous to compile and maintain a neighbor cell "list," which is also known as a "neighbor cell relation," (e.g., a database, ordered list, unordered list, or other collection of information) of the cells that neighbor the particular cell. A neighbor cell list for a particular cell contains the PCI and GCI of each cell that neighbors the particular cell. This neighbor cell list may be used by the base station that serves the cell to communicate with other base stations that server the neighbor cells.

One way to compile and maintain a neighbor cell list for a particular cell is to manually create and update the list. However, it is preferred to have systems and methods for automatically updating the list. One way to automatically update the list is to request a mobile terminal (a.k.a., user equipment (UE)) using the particular cell to obtain the GCI of a neighboring cell and report the GCI to the base station that serves the particular cell. A problem with this approach is that it may take a relatively long period of time for the UE to obtain the GCI and while the UE is attempting to obtain the GCI the UE may not be able to receive data from the base station.

What is desired are improved systems and methods for automatically determining the global cell identifier (GCI) of a neighboring cell.

SUMMARY

In one aspect, the invention provides a systems and methods for automatically adding a unique identifier associated with a second cell to a neighbor cell list associated with a first cell. In some embodiments, the method includes the following steps: (1) receiving, at a first base station that serves the first cell, a message transmitted by a mobile terminal, the message comprising a non-unique identifier associated with the second cell and/or cell quality information pertaining to the second cell; (2) after receiving the message, determining whether the unique identifier associated with the second cell should be added to the neighbor cell list associated with the first cell; (3) in response to determining that the unique identifier associated with the second cell should be added to the neighbor cell list, selecting a particular mobile terminal from a set of mobile terminals; (4) instructing the selected mobile terminal to obtain and report the unique identifier associated with the second cell; (5) receiving from the selected mobile terminal the unique identifier; and (6) adding the unique identifier to the neighbor cell list, wherein the step of selecting the particular mobile terminal from the set of mobile terminals comprises determining which of the mobile terminals in the set appears to have a relatively high probability of obtaining the unique identifier within a certain window of time and selecting that mobile terminal.

In some embodiments, the step of determining whether the unique identifier associated with the second cell should be added to the neighbor cell list comprises determining whether a mobile terminal has transmitted to the first base station via the first cell a message containing the non-unique identifier associated with the second cell at least T1 times within a certain period of time, where T1 is a predetermined threshold parameter.

In some embodiments, the step of determining which of the mobile terminals in the set appears to have a relatively high probability of obtaining the unique identifier within the certain window of time comprises determining whether a mobile terminal included in the set has transmitted to the first base station via the first cell a message containing the non-unique identifier associated with the second cell at least T1 times within a certain period of time, where T1 is a predetermined threshold parameter.

In other embodiments, the step of determining whether the unique identifier associated with the second cell should be added to the neighbor cell list comprises determining whether the first base station has received via the first cell and within a certain period of time at least T3 messages containing the non-unique identifier associated with the second cell, where T3 is a predetermined threshold parameter. In such embodiments, the step of determining which of the mobile terminals in the set appears to have a relatively high probability of obtaining the unique identifier within the certain window of time may include determining the mobile terminal included in the set that, within the certain period of time, transmitted the greatest number of the messages containing the non-unique identifier associated with the second cell, and the step of selecting the particular mobile terminal comprises selecting the mobile terminal that was determined to have transmitted, within the certain period of time, the greatest number of the messages containing the non-unique identifier associated with the second cell.

In some embodiments, the method also includes recording cell quality information regarding the second cell that was received from any of a plurality of mobile terminals within some particular period of time. In such embodiments, the determination as to whether the unique identifier associated with the second cell should be added to the neighbor cell list is based, at least in part, on the recorded cell quality information, and the step of determining which of the mobile terminals in the set appears to have a relatively high probability of obtaining the unique identifier within the certain window of time may include determining the mobile terminal from the set that has reported the best cell quality information with respect to the second cell.

In some embodiments, the step of determining which of the mobile terminals in the set appears to have a relatively high probability of obtaining the unique identifier within the certain window of time comprises: determining a speed value indicating the speed at which a mobile terminal included in the set is moving; and/or determining a cell quality value pertaining to the second cell that was reported by a mobile terminal included in the set; and/or determining a propagation delay value that indicates the propagation delay between a mobile terminal included in the set and the second cell.

In some embodiments, the method may also include acquiring the reference timing of the second cell, and using the acquired reference timing to schedule one or more gaps during which the particular mobile terminal should attempt to obtain the unique identifier associated with the second cell.

In another aspect, the invention provides an improved base station. In some embodiments, the improved base station includes: a receiver operable to receive from a mobile terminal a message comprising a non-unique identifier associated with a second cell served by a second base station and/or cell quality information pertaining to the second cell; a transmitter; a data processing system; and a data storage system storing a set of computer instructions, the set of computer instructions comprising: computer instructions for determining whether a unique identifier associated with the second cell should be added to a neighbor cell list associated with a first cell served by the improved base station; computer instructions for selecting a particular mobile terminal from a set of mobile terminals in response to a determination that the unique identifier associated with the second cell should be added to the neighbor cell list; computer instructions for using the transmitter to transmit to the selected mobile terminal a message instructing the selected mobile terminal to obtain and report the unique identifier associated with the second cell; and computer instructions for adding the unique identifier to the neighbor cell list after the receiver receives from the selected mobile terminal the unique identifier, wherein the computer instructions for selecting a particular mobile terminal from the set of mobile terminals comprises computer instructions for determining which of the mobile terminals in the set appears to have a relatively high probability of obtaining the unique identifier within a certain window of time and selecting that mobile terminal.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
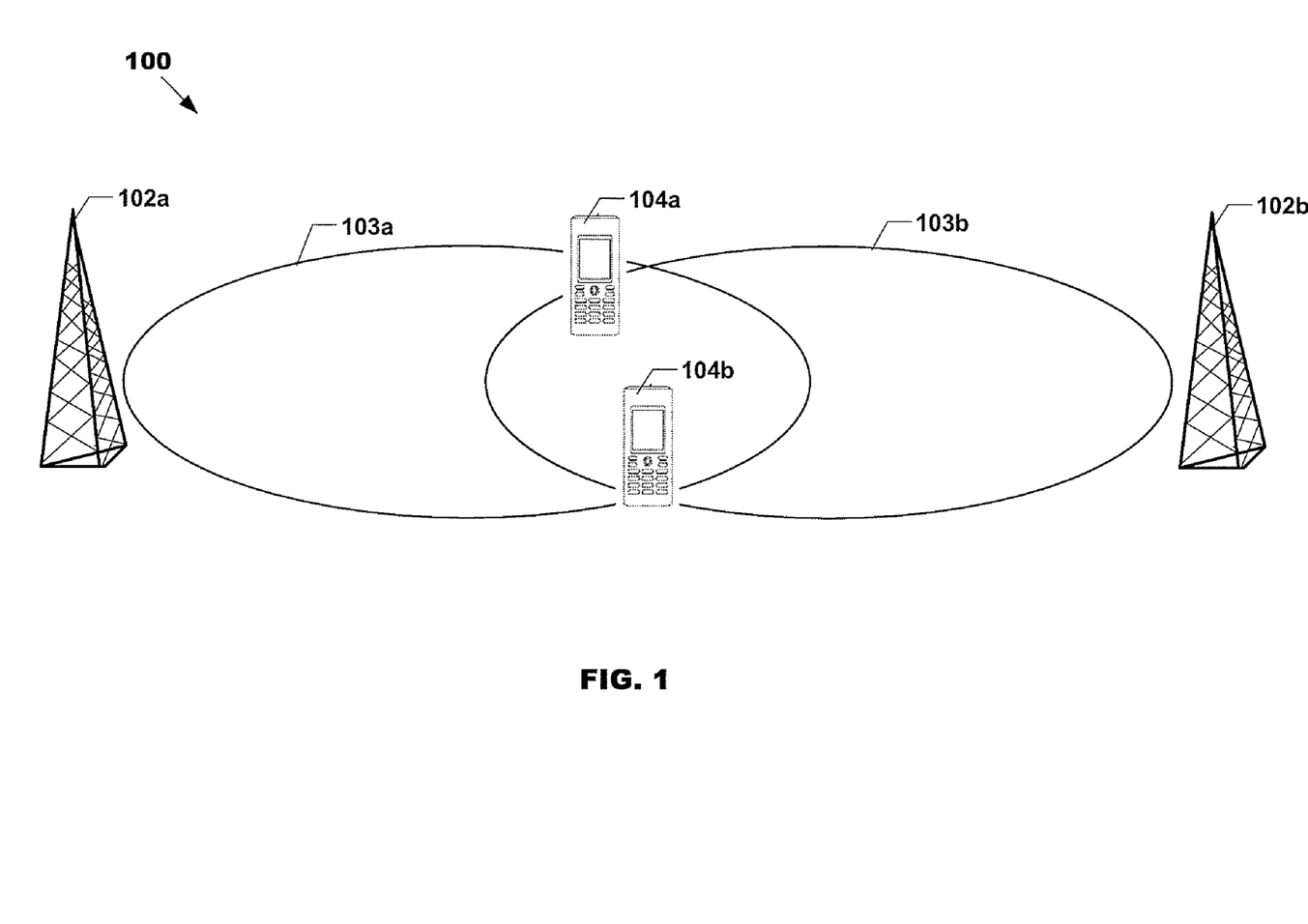
FIG. 1 illustrates a portion of a mobile network.

Referring now to FIG. 1, FIG. 1 illustrates a portion of a mobile network 100. As shown in FIG. 1, mobile network 100 includes: a base station 102a that serves a cell 103a, a base station 102b that serves a cell 103b, a UE 104a in active communication with base station 102a via cell 103a, and a UE 104b in active communication with base station 102a via cell 103a. That is, cell 103a serves UEs 104a,b. Accordingly, cell 103a is referred to as the "serving cell." To illustrate various aspects and embodiments of the invention, we shall assume that cell 103b is a neighbor of cell 103a and the neighbor cell list for cell 103a does not include the GCI of cell 103b (i.e., with respect to cell 103a, cell 103b is an unknown cell). Accordingly, the neighbor cell list for cell 103a should be updated to include the GCI of cell 103b. While FIG. 1 shows only two base station, two cells, and two UEs, this was done for the sake of simplicity as it is well known that a mobile network may contain many base stations, many cells and many UEs and that a base station may server more than one cell.

Figure 2:
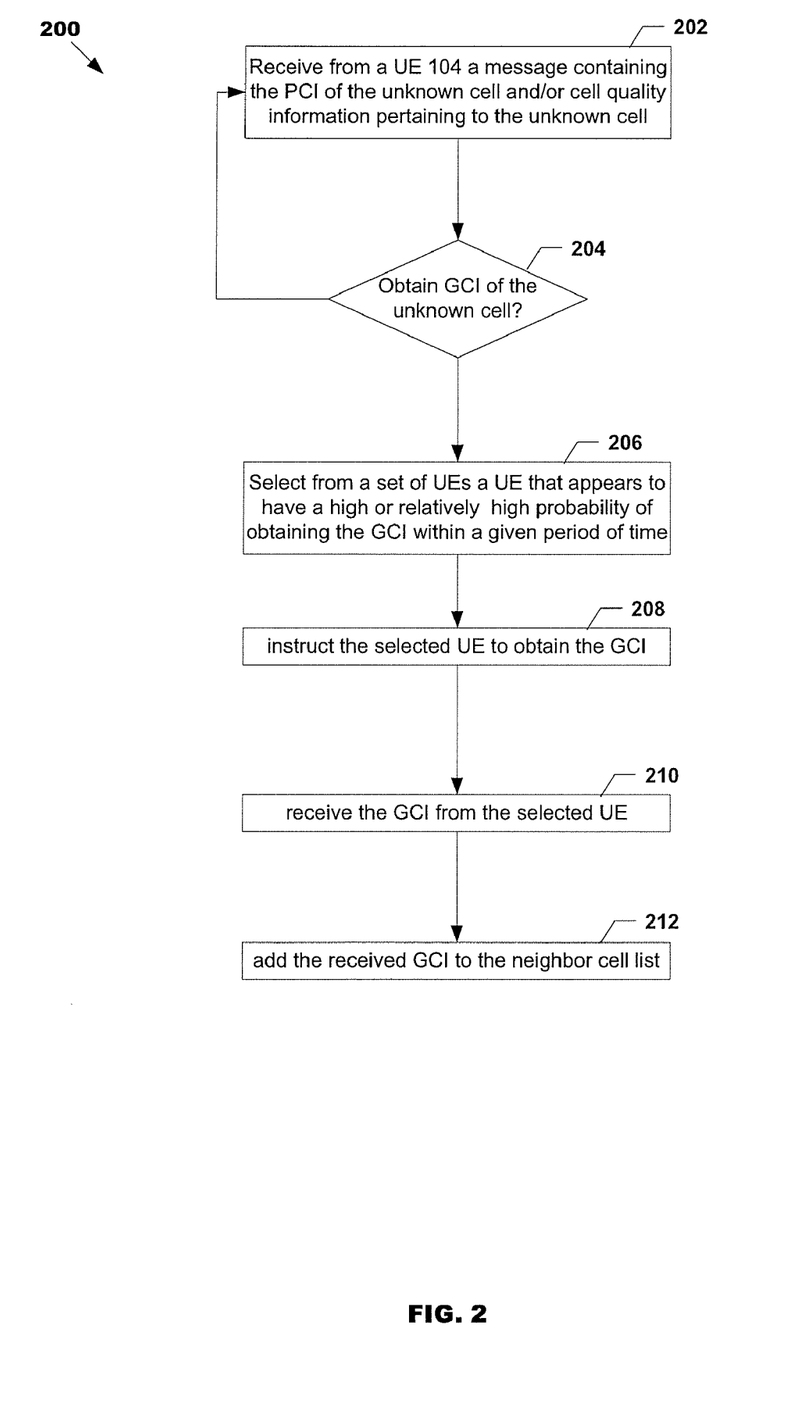
FIG. 2 is a flow chart illustrating a process according to some embodiments of the invention.

Referring now to FIG. 2, FIG. 2 is a flow chart illustrating a process 200 for automatically adding the GCI of cell 103b to the neighbor cell list for cell 103a. Process 200 may begin in step 202, where base station 102a receives from a UE 104 (e.g., UE 104a or UE 104b) a message containing (1) an identifier associated with cell 103b (e.g., the PCI of cell 103b) and/or (2) cell quality information (e.g., a reference signal received power (RSRP) value) pertaining to cell 103b. The message from the UE is typically either sent in response to an event or sent periodically and contains one or more measurement quantity from one or more neighbor cells and their identifier (e.g. PCI). It is well known in the art of mobile networks that, for handover purposes, a UE sends to its serving base station a message containing a PCI of a neighboring cell. For example, it is well known that base station 102a can request a UE 104 to report the PCI of N best neighbor cells on the serving carrier frequency and M best neighbor cells on inter-frequency carriers. Typically, N=6-8, M=4-6 and M<N. As is also well known in the art, base station 102s can request a UE 104 to report the quality (e.g., an RSRP value) of at most N and M best neighbor cells on the serving carrier frequency (intra-frequency) and inter-frequency carriers, respectively.

In response to receiving the message, process 200 proceeds to step 204. In step 204, base station 102a determines whether it should instruct a UE 104 to obtain the GCI for cell 103b. If base station determines that it should instruct a UE 104 to obtain the GCI for cell 103b, then process 200 proceeds to step 206, otherwise it may proceed back to step 202. The determination as to whether base station 102a should instruct a UE 104 to obtain the GCI for cell 103b may be based on one or more factors. For example, the determination may be based on one or more of: statistics regarding reported PCIs, statistics regarding reported cell quality, and statistics of handover failures.

In step 206, base station 102a selects from a set of UEs a UE 104 that has a relatively high probability of being able to obtain the GCI within a given period of time. The selection may be based on or more factors. For example, the selection may be based on one or more of: statistics regarding reported PCIs, statistics regarding reported cell quality, statistics of handover failures, statistics regarding the speed of the UEs in the set, statistics regarding propagation delay.

In step 208, base station 102a instructs the selected UE to obtain the GCI of cell 103b. It is well known in the state of the art that UEs are capable of receiving a GCI for a cell. For example, in an evolved universal terrestrial radio access network (E-UTRAN), the GCI of a cell is transmitted on one of the system information blocks (SIB), which in turn is mapped on the physical downlink shared channel (PDSCH). The PDSCH containing SIBs is often referred to as the dedicated broadcast channel (D-BCH). In order to decode the PDSCH or the so-called D-BCH containing SIBs, the UE needs to first acquire necessary fundamental information of the cell (e.g. cell transmission bandwidth, system frame number (SFN), cell antenna configuration etc) transmitted on the master information block (MIB), which is mapped on physical broadcast channel (PBCH). The PBCH is interleaved over 40 ms in four transmissions (one per frame). The information content can change every 40 ms therefore UE is not allowed to combine the transmissions across the 40 ms PBCH interleaving boundary. The SIBs are also transmitted periodically, this means GCI is also sent periodically once every L radio frames. More specifically in E-UTRAN, the CGI is mapped on SIB #1, which in turn is transmitted over 4 consecutive identical transmissions or data blocks over 80 ms period. Each transmission within SIB#1is repeated every 20 ms period. The repetition of information within SIB #1 allows the UE to combine the received blocks thereby improving the decoding performance. Since in principle the information contents of SIB #1 can change every 80 ms therefore UE should only combine blocks within 80 ms SIB #1 transmission and not across the 80 boundaries. In step 210, base station 102a receives from the selected UE a message containing the GCI of cell 103b. In step 212, base station 102a adds the GCI to the neighbor cell list for cell 103a.

Figure 3:
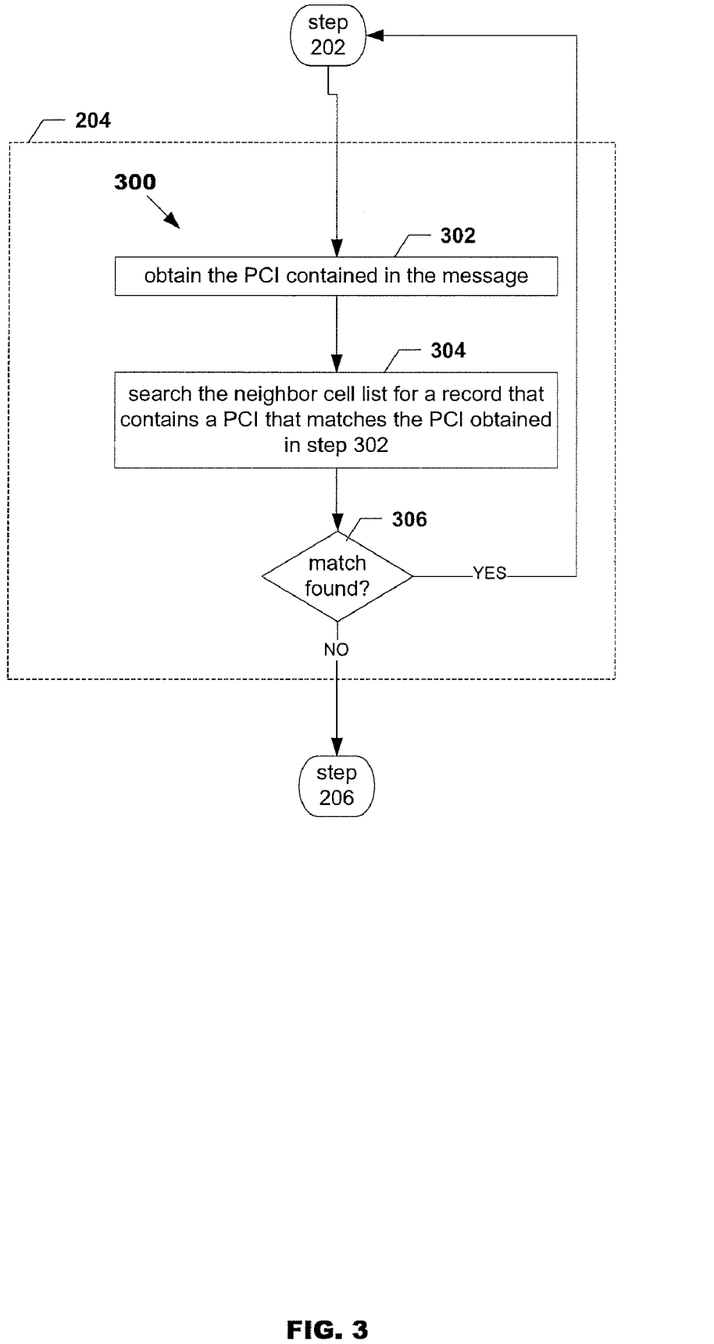
FIG. 3 is a flow chart illustrating a process according to some embodiments of the invention.

Referring now to FIG. 3, FIG. 3 is a flow chart illustrating a process 300 for performing step 204. That is, process 300 is a process for determining whether or not to instruct a UE 104 to obtain the GCI of a neighbor cell with respect to cell 103a. Process 300 assumes that the message received in step 202 contains the PCI of the neighbor cell. Process 300 may begin in step 302, where base station 102a obtains the PCI contained in the message. In step 304, base station 102a searches the neighbor cell list belonging to cell 103a for a record that contains a PCI that matches the PCI obtained in step 302. In step 306, base station 102a determines whether a match was found. If a match was found, then base station 102a need not instruct any UE to obtain the GCI of the neighbor cell, otherwise base station 102a should instruct a UE (e.g., the UE that transmitted the message containing the PCI of the neighbor cell) to obtain the GCI of the neighbor cell.

Figure 4:
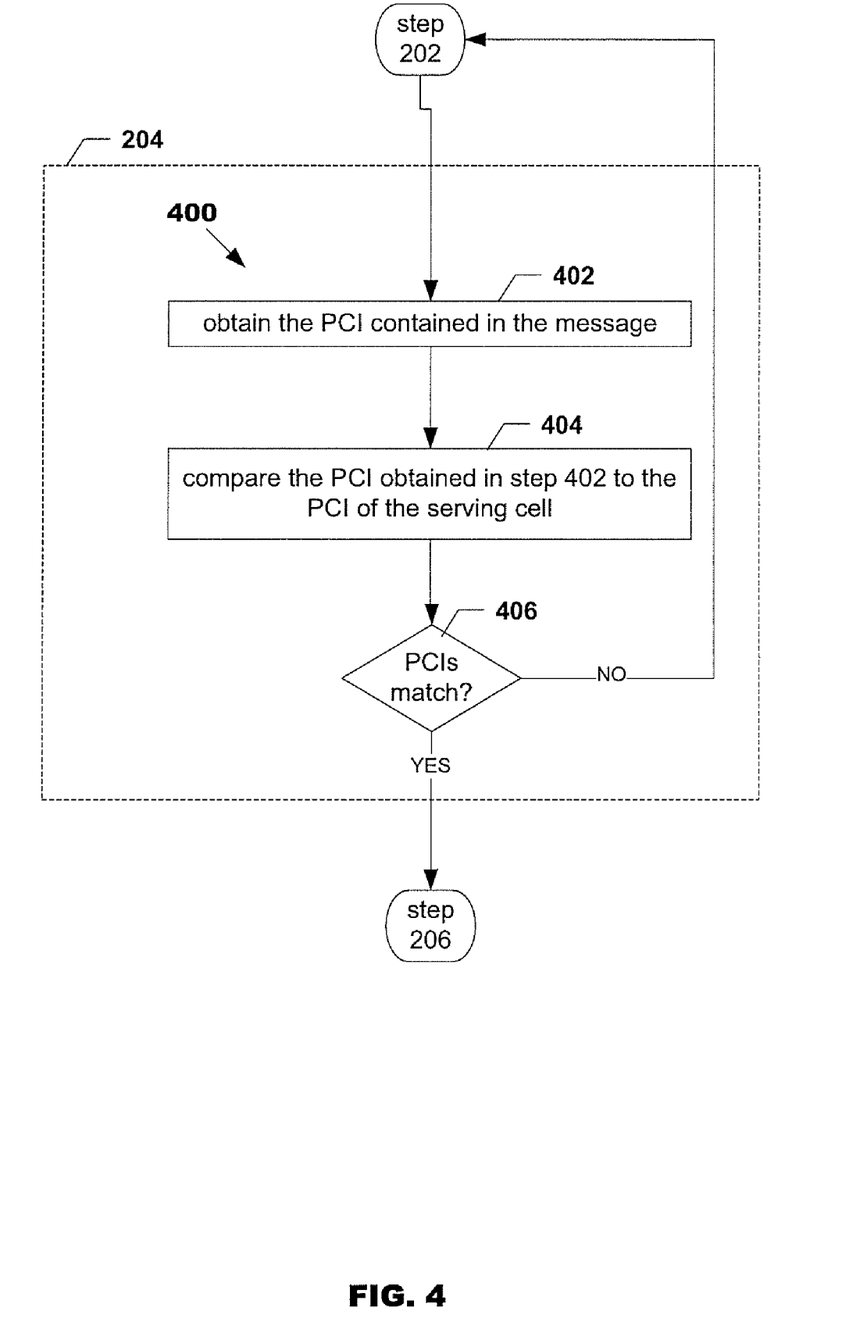
FIG. 4 is a flow chart illustrating a process according to some embodiments of the invention.

Referring now to FIG. 4, FIG. 4 is a flow chart illustrating a process 400 for performing step 204. Process 400 assumes that the message received in step 202 contains the PCI of the neighbor cell. Process 400 may begin in step 402, where base station 102a obtains the PCI contained in the message. In step 404, base station 102a compares the PCI obtained in step 402 to the PCI of the serving cell. In step 406, base station 102a determines whether the PCIs match. If they match, then base station 102a should instruct a UE (e.g., the UE that transmitted the message containing the PCI of the neighbor cell) to obtain the GCI of the neighbor cell.

Figure 5:
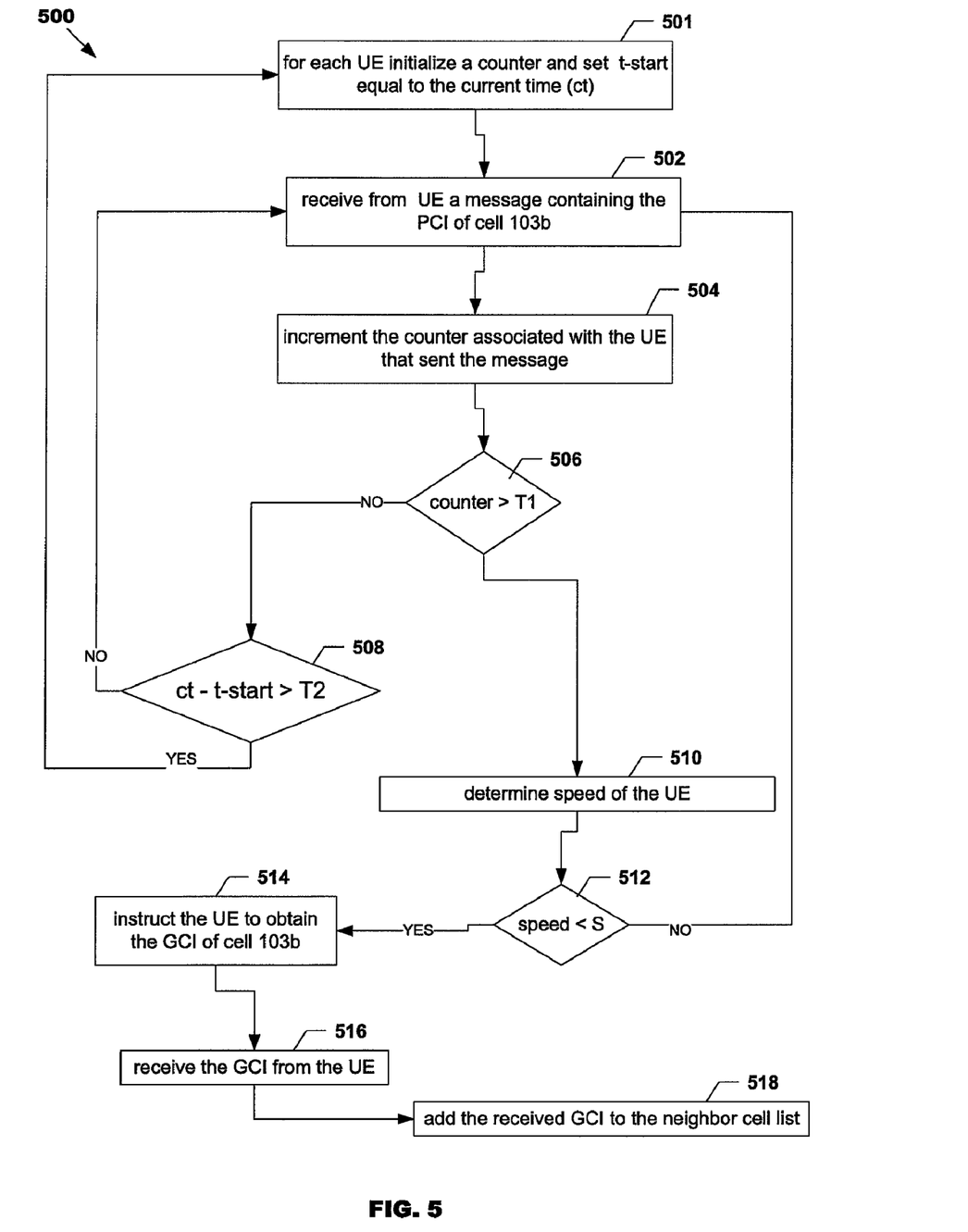
FIG. 5 is a flow chart illustrating a process according to some embodiments of the invention.

Referring now to FIG. 5, FIG. 5 is a flow chart illustrating a process 500 for automatically adding the GCI of cell 103b to the neighbor cell list for cell 103a. Process 500 may begin in step 501, where base station 102a sets the variable t-start equal to the current time (ct) and initializes a counter for each UE 104. In step 502, base station 102a receives from a UE 104 a message containing an identifier (e.g., PCI) associated with cell 103b (i.e., an unknown cell). In step 504, increments the counter associated with the UE that sent the message. In step 506, base station 102a determines whether the counter incremented in step 504 is greater than or equal to a threshold T1. If the counter is greater than or equal to T1, then process 500 proceeds to step 510, otherwise it proceeds to step 508. In step 508, base station 102a determines whether the amount of time that has elapsed since performing step 501 is greater than or equal to a second threshold T2. If it is greater than or equal to T2, then process 500 proceeds back to step 501, otherwise it proceeds back to step 502. In step 510 base station 102a determines the speed of the UE that sent the message. In step 512, base station 102a determines whether the speed is less than a speed threshold S. If the speed of the UE is less than S, then base station 102a instructs the UE to obtain the GCI of cell 103b (step 514). In step 516, base station 102a receives from the UE a message containing the GCI of cell 103b. In step 518, base station 102a adds the GCI to the neighbor cell list for cell 103a.

Figure 6:
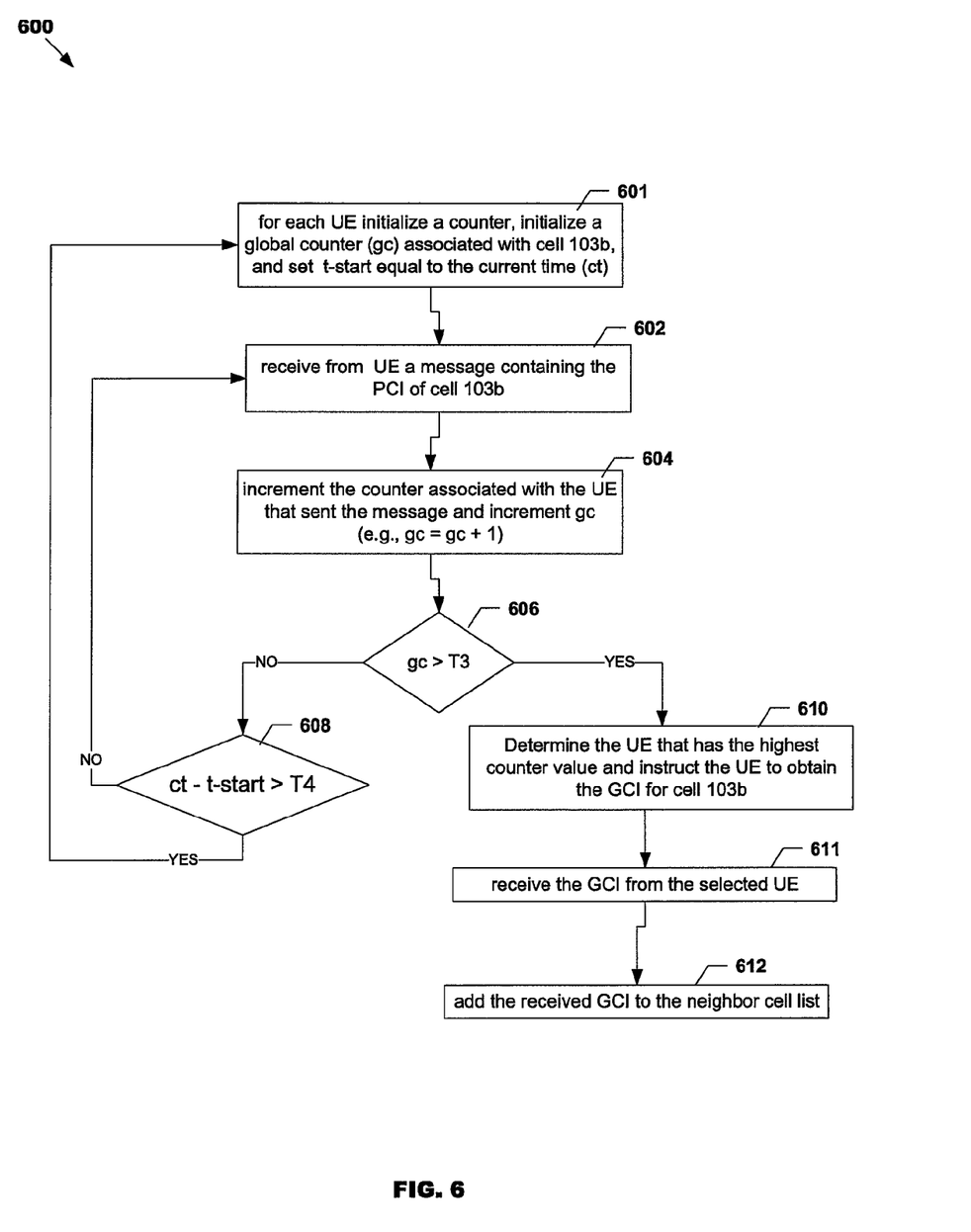
FIG. 6 is a flow chart illustrating a process according to some embodiments of the invention.

Referring now to FIG. 6, FIG. 6 is a flow chart illustrating a process 600 for automatically adding the GCI of cell 103b to the neighbor cell list for cell 103a. Process 600 may begin in step 601, where base station 102a sets the variable t-start equal to the current time (ct), initializes a counter for each UE 104, and initializes a global counter (gc). In step 602, base station 102a receives from a UE 104 a message containing an identifier associated with cell 103b. In step 604, increments the global counter and the counter associated with the UE that sent the message. In step 606, base station 102a determines whether the global counter incremented in step 604 is greater than or equal to a threshold T3. If the counter is greater than or equal to T3, process 600 proceeds to step 610, otherwise it proceeds to step 608. In step 608, base station 102a determines whether the amount of time that has elapsed since performing step 601 is greater than or equal to a threshold T4. If it is greater than or equal to T4, then process 600 proceeds back to step 601, otherwise it proceeds back to step 602. In step 610 base station 102a determines the UE that has the highest counter value and instructs that UE to obtain the GCI of cell 103b. In step 611, base station 102a receives from the UE a message containing the GCI of cell 103b. In step 612, base station 102a adds the GCI to the neighbor cell list for cell 103a.

The thresholds used in process 500 and 600 are chosen so as to provide sufficient assurance that cell 103b is indeed a neighbor cell that should be added to the neighbor cell list belonging to cell 103a. Additionally, the UE selected to obtain the GCI is a UE that is expected to be close to cell 103b. This means radio conditions experienced by the selected UE with respect to cell 103b are expected to be good, thereby ensuring that the UE can obtain the GCI of cell 103b relatively quickly and thereby enabling base station 102s to schedule a small gap for GCI decoding so as to minimize data interruption.

Figure 7:
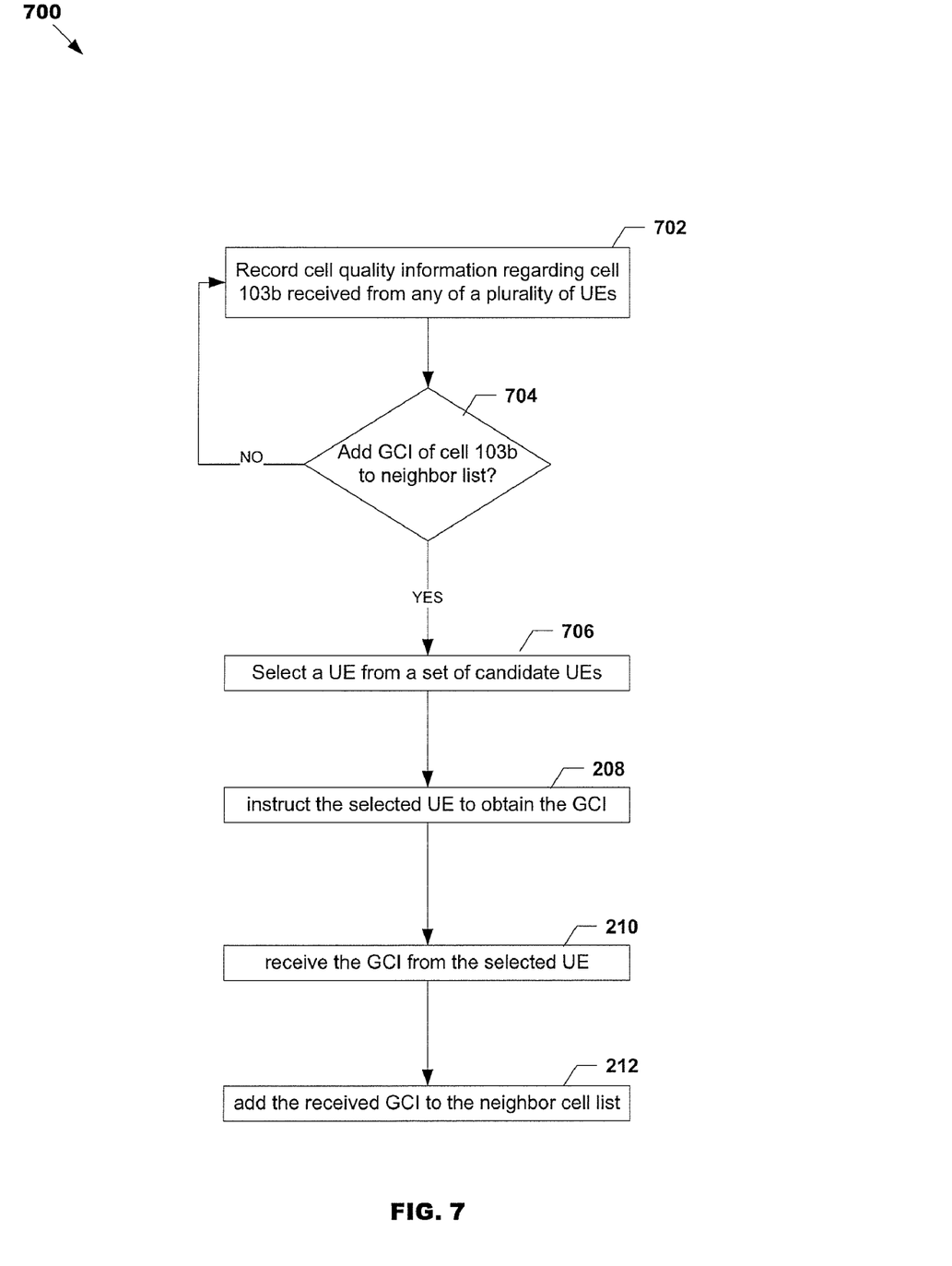
FIG. 7 is a flow chart illustrating a process according to some embodiments of the invention.

Referring now to FIG. 7, FIG. 7 is a flow chart illustrating a process 700 for automatically adding the GCI of cell 103b to the neighbor cell list for cell 103a. Process 700 may start in step 702, where base station 102a records cell quality information (e.g., RSRP values) regarding cell 103b received from any of a plurality of UEs 104 within some particular period of time. In step 704, base station 102a determines whether the GCI of cell 103b should be added to the neighbor cell list of cell 103a, where the determination is based on the recorded cell quality information. If base station 102a determines that the GCI of cell 103b should be added to the neighbor cell list of cell 103a, then process 700 proceeds to step 706, otherwise the process returns to step 702. For example, if the recorded cell quality information indicates that at least X % of the plurality of UEs 104 have reported a cell quality that exceeds a cell quality threshold Q1, then process 700 will proceed to step 706. As another example, if the recorded cell quality information indicates that the average reported cell quality value exceeds a cell quality threshold Q2, then process 700 will proceed to step 706. In step 706, base station 102a selects a UE from a candidate set of UEs. For example, the candidate set of UEs may consist of all of the UEs that have reported cell quality information pertaining to cell 103b within the particular period of time. After step 706, process 700 proceeds to steps 208-212, which are discussed above with reference to FIG. 2. The cell quality thresholds Q1 and Q2 may vary over time and may be a function of one or more RSRP values (or other cell quality metric such as reference symbol received quality (RSRQ)) pertaining to cell 103a or to a cell that is a neighbor of cell 103a.

Figure 8:
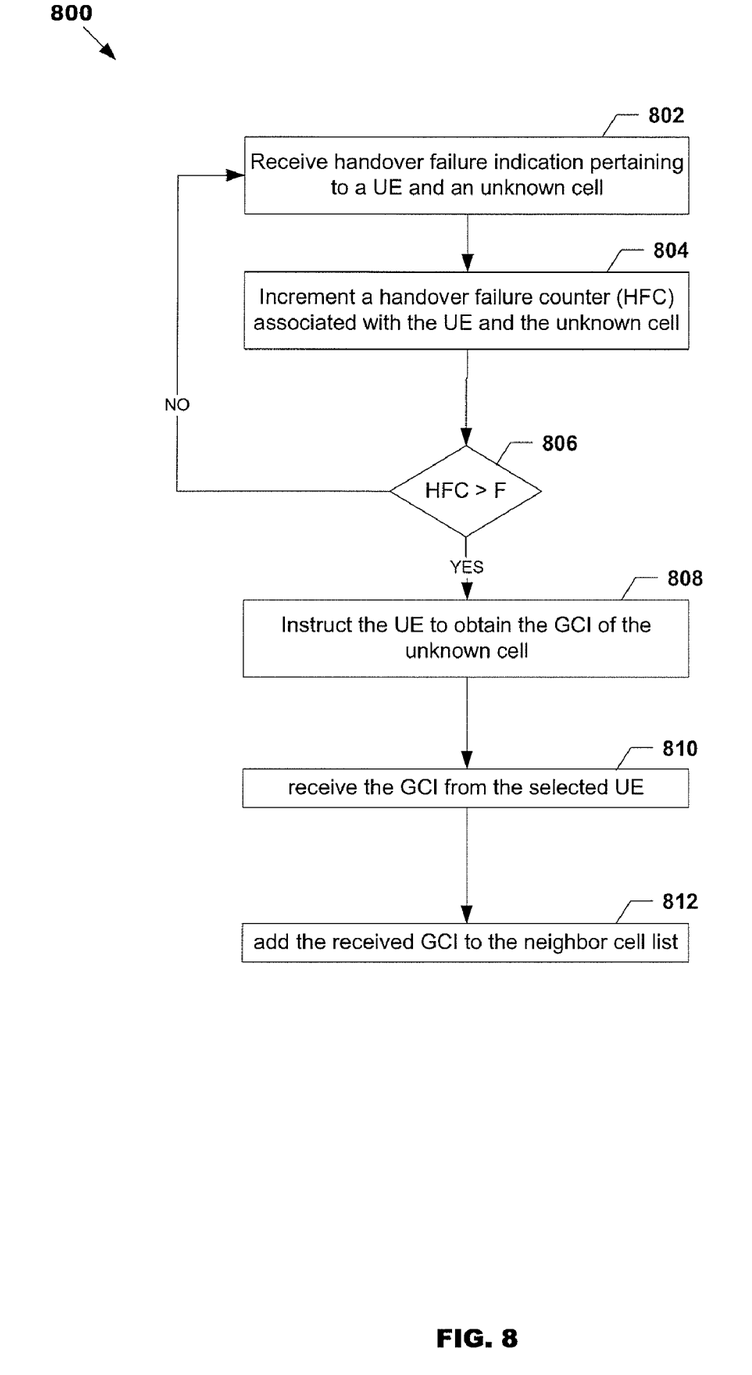
FIG. 8 is a flow chart illustrating a process according to some embodiments of the invention.

Referring now to FIG. 8, FIG. 8 is a flow chart illustrating a process 800 for automatically adding the GCI of an unknown cell to the neighbor cell list for cell 103a. Process 800 may start in step 802, where base station 102a receives an indication that a handover of a UE 104 using cell 103a to an unknown cell (e.g., a cell for which the cell's GCI is not included in cell's 103a neighbor cell list) has failed. In step 804, base station 102a increments a handover failure counter that keeps track of the number of failed attempts to handover the UE to the unknown cell. In step 806, base station 102a determines whether the handover failure counter (HFC) equals a failure threshold F. If the HFC=F, then process 800 proceeds to step 808, otherwise it returns to step 802 . In step 808, base station 102a instructs the UE to obtain the GCI of the unknown cell. In step 810, base station 102a receives from the UE a message containing the GCI of the unknown cell. In step 812, base station 102a adds the GCI to the neighbor cell list for cell 103a.

Figure 9:
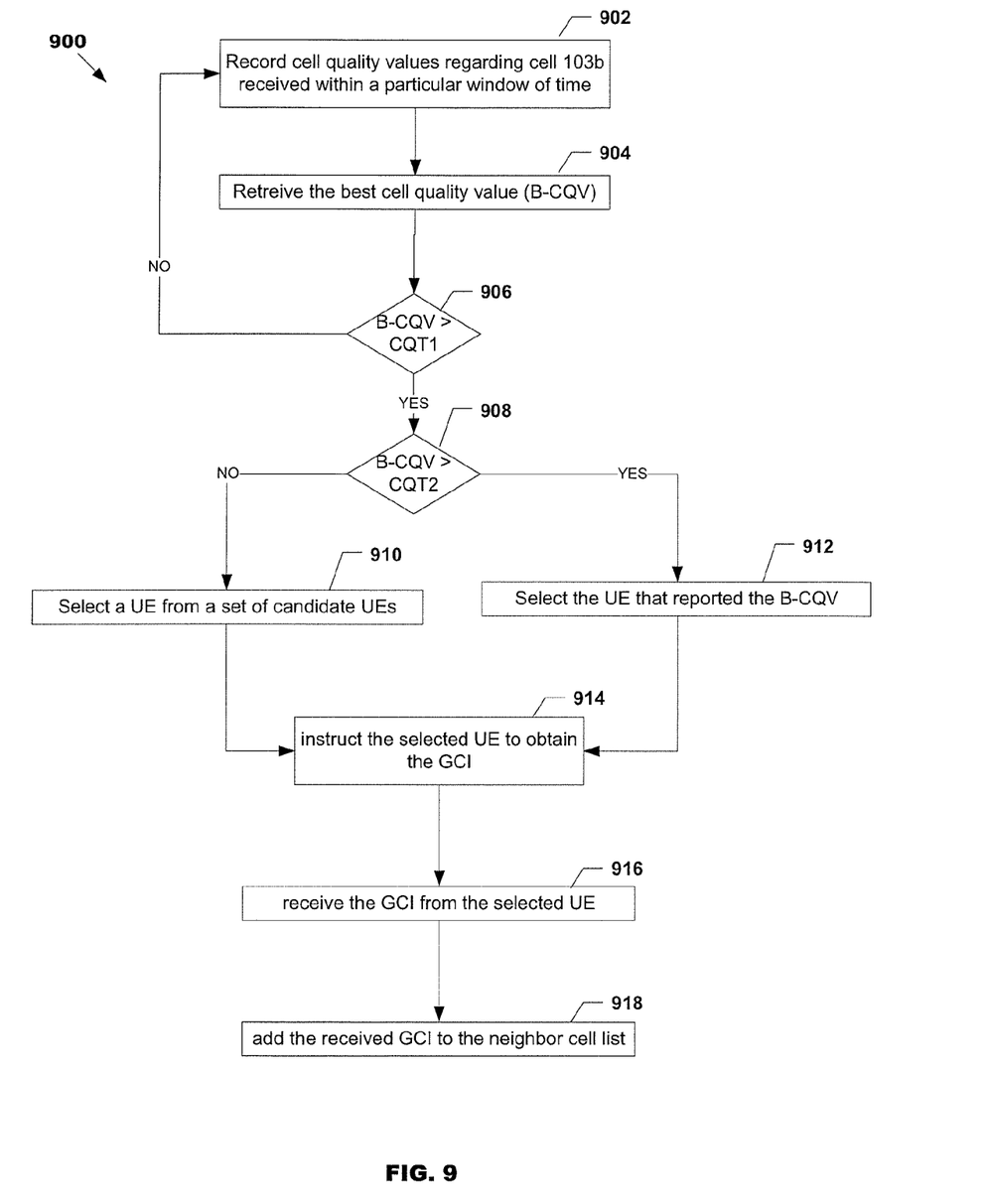
FIG. 9 is a flow chart illustrating a process according to some embodiments of the invention.

Referring now to FIG. 9, FIG. 9 is a flow chart illustrating a process 900 for automatically adding the GCI of cell 103b to the neighbor cell list for cell 103a. Process 900 may start in step 902, where base station 102a records cell quality values (e.g., RSRP values) regarding cell 103b received from any of a plurality of UEs 104 within some particular period of time. In step 904, base station 102 retrieves the best recorded cell quality value (B-CQV) from the set of recorded cell quality values. In step 906, base station 102a determines whether B-CQV is greater than a cell quality threshold (CQT1). In some embodiments, CQT1 is a function of a cell quality value (e.g., an RSRP value) pertaining to cell 103a or a neighbor of cell 103a. For example, in some embodiments, CQT1=RSRP−c1, where RSRP is an RSRP value pertaining to cell 103a or a neighbor of cell 103a and c1 is a predetermined constant. If B-CQV is not greater than CQT1, then the process returns to step 902, otherwise it proceeds to step 908. In step 908, base station 102a determines whether B-CQV is greater than a cell quality threshold (CQT2). In some embodiments, CQT2 is a function of a cell quality value (e.g., an RSRP value) pertaining to cell 103a or a neighbor of cell 103a. For example, in some embodiments, CQT2=RSRP−c2, where RSRP is an RSRP value pertaining to cell 103a or a neighbor of cell 103a and c2 is a predetermined constant. Preferably, c2 is less than c1. For example, in some embodiments, c2=3 dB and c1=10 dB. If B-CQV is greater than CQT2, then the process proceeds to step 912, otherwise it proceeds to step 910. In step 910, base station 102a selects a UE from the plurality of UEs. In step 912, base station 102a selects the UE that reported the B-CQV value. In step 914, base station 102a instructs the selected UE to obtain the GCI of cell 103b. In step 916, base station 102a receives from the selected UE a message containing the GCI of cell 103b. In step 918, base station 102a adds the GCI to the neighbor cell list for cell 103a.

Figure 10:
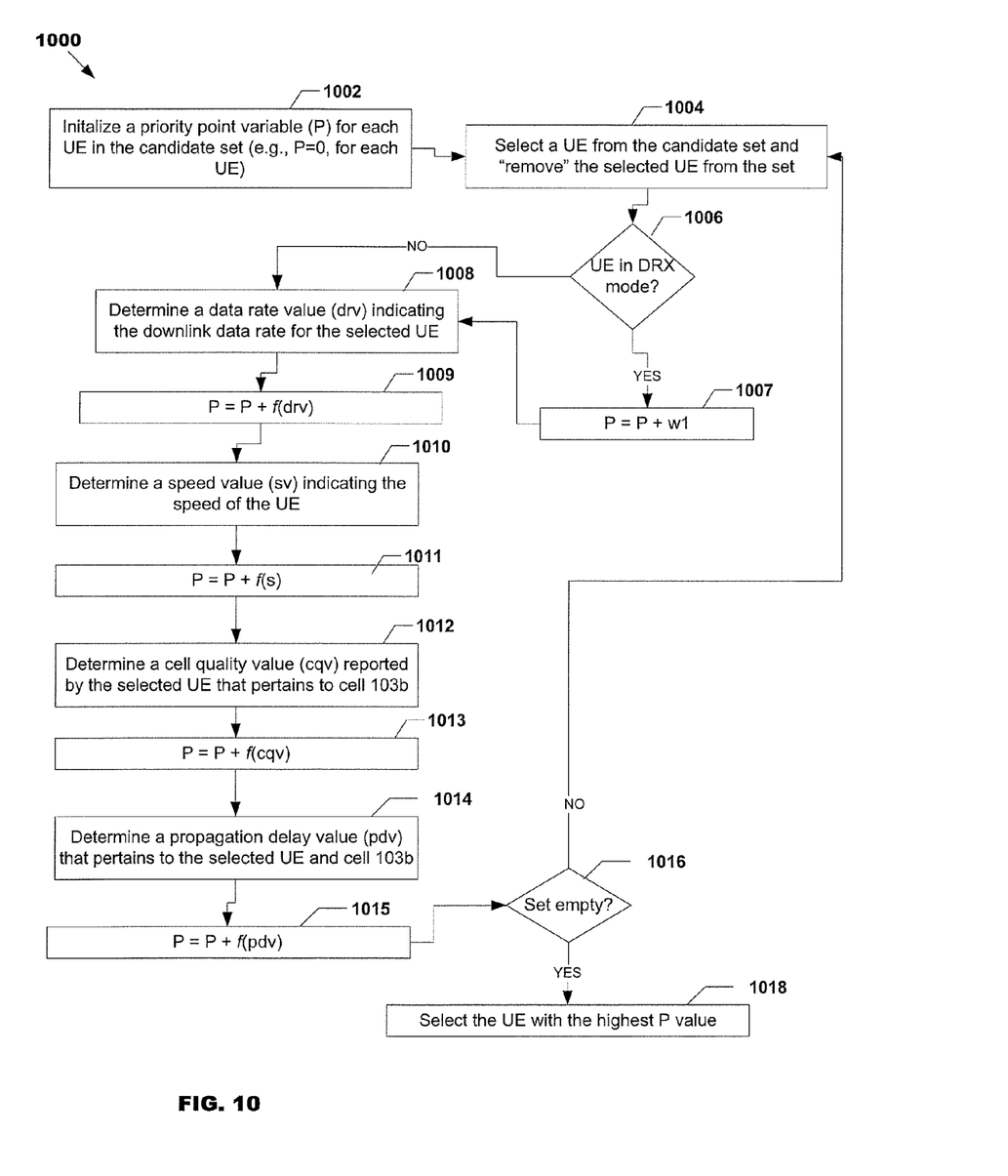
FIG. 10 is a flow chart illustrating a process according to some embodiments of the invention.

Referring now to FIG. 10, FIG. 10 is a flow chart illustrating a process 1000 for selecting from a candidate set of UEs a particular UE to instruct to obtain the GCI of a neighbor cell (i.e., for performing steps 260, 706 and 910). Process 1000 may begin in step 1002, where base station 102a initializes a priority point variable P for each UE in the candidate set (e.g., P is set equal to 0 for each UE). In step 1004, base station 102a selects a UE from the set and "removes" the UE from the set. Base station 102a may "remove" the UE from the set merely by setting a flag associated with the UE that indicates that the UE has been selected.

In step 1006, base station 102a determines whether the selected UE is in a discontinuous transmission mode (DRX) mode. If the selected UE is in the DRX mode, the P value for the selected UE is increased (e.g., P=P+w1) (step 1007). In step 1008, base station 102a determines a data rate value indicating the downlink data rate for the selected UE. In step 1009, the P value for the selected UE is increased (or decreased) by an amount that is a function of the data rate value. For example, if the data rate value is greater than a data rate threshold, then the P value for the selected UE may be increased by a predetermined amount, otherwise the P value remains unchanged.

In step 1010, base station 102a determines a speed value indicating the speed at which the selected UE is moving. In step 1011, the P value for the selected UE is increased (or decreased) by an amount that is a function of the speed value. For example, if the speed value is less than a speed threshold, then the P value for the selected UE may be increased by a predetermined amount, otherwise the P value remains unchanged.

In step 1012, base station 102a determines a cell quality value pertaining to cell 103b that was reported by the selected UE to base station 102a. In step 1013, the value for the selected UE is increased (or decreased) by an amount that is a function of the reported cell quality value.

In step 1014, base station 102a determines a propagation delay value that indicates the propagation delay between the selected UE and cell 103b. In step 1015, the value for the selected UE is increased (or decreased) by an amount that is a function of the propagation delay value.

In step 1016, base station 102a determines whether the candidate set is "empty" (i.e., it determines whether all of the UEs from the set have been selected). If it is not empty, the process proceeds back to step 1004, otherwise it proceeds to step 1018. In step 1018, base station 102a selects the UE that has the highest P value.

As discussed previously, in some networks (e.g., E-UTRAN), a UE 104 cannot simultaneously obtain a GCI of cell 103b and receive downlink data from base station 102a. Accordingly, the amount of time that base station 102a schedules UE 104 for attempting to obtain the GCI of an unknown cell should be minimized. This scheduled amount of time is referred to as a "gap." Thus, it is preferable that the gap be kept as small as possible. It is also preferable that the gap be schedule at a time when it is likely that the desired GCI will be broadcast.

Accordingly, in some embodiments, base station 102a is configured to directly or indirectly acquire the reference timing of the unknown cell (i.e., the cell whose GCI is to be obtained by the UE). The reference timing can be the frame timing, occurrence of a broadcast channel (BCH), etc. The advantage of acquiring the reference timing is that the reference timing can be used by base station 102*a* to determine the time (or approximate time) when a broadcast channel (e.g., physical broadcast channel (PBCH) and D-BCH) of cell 103*b* will be present. By having this information, base station 102*a* can schedule the gap to occur at or near this time. This will enable the base station 102*a* to schedule a short gap because, assuming radio conditions are good, the UE should be able to decode the GCI in a single gap as the gap should occur at the time (or near the time) the GCI is transmitted by cell 103*b*. Hence, a long gap is not required. If the gap were not scheduled to occur at the time (or near the time) the GCI is broadcast, then the UE may require multiple gaps to decode the GCI or a very long gap. Accordingly, each scheduled gap, whether single or periodic, can be set to smallest possible length in time, which is sufficient enough to get the required GCI. This type of precision in the gap length cannot be scheduled without the reference timing information of the unknown cell.

The reference timing of the unknown cell can be attained by any means including any state of the art techniques. One option is to get the timing directly from the unknown cell over some fixed interface. However, because the cell is "unknown", it may not be possible to get the timing directly from the unknown cell.

Another possibility is that when a UE 104 reports the PCI of the unknown cell, base station 102*a* requests the UE to report the time difference (delta-t) between the serving cell and the unknown cell. The base station 102*a* can use this information to calculate the reference timing Ru of the unknown cell using the following equation:

$$Ru=Rs-\text{delta-}t+Ts-Tu,$$

where Rs is the reference timing of the serving cell, Ts is the one way propagation delay between the UE and the serving cell, and Tu is the one way propagation delay between the UE and the unknown cell.

Base station 102*a* knows Rs and knows delta-t because delta-t was reported by the UE. Base station 102*a* may estimate Ts and Tu. By calculating Ru, base station 102 can schedule the gap for UE to obtain the GCI of the unknown cell at the right occasion. In synchronized cells, because frame timings are the same therefore gap activation can easily be scheduled at the right occasion. But there might still be some drift in timing of the serving and the unknown cells. Thus reference timing of an unknown cell used for gap activation for GCI decoding can be refined by using the latest time difference measurements (e.g. delta-t) reported by the UE.

Figure 11:
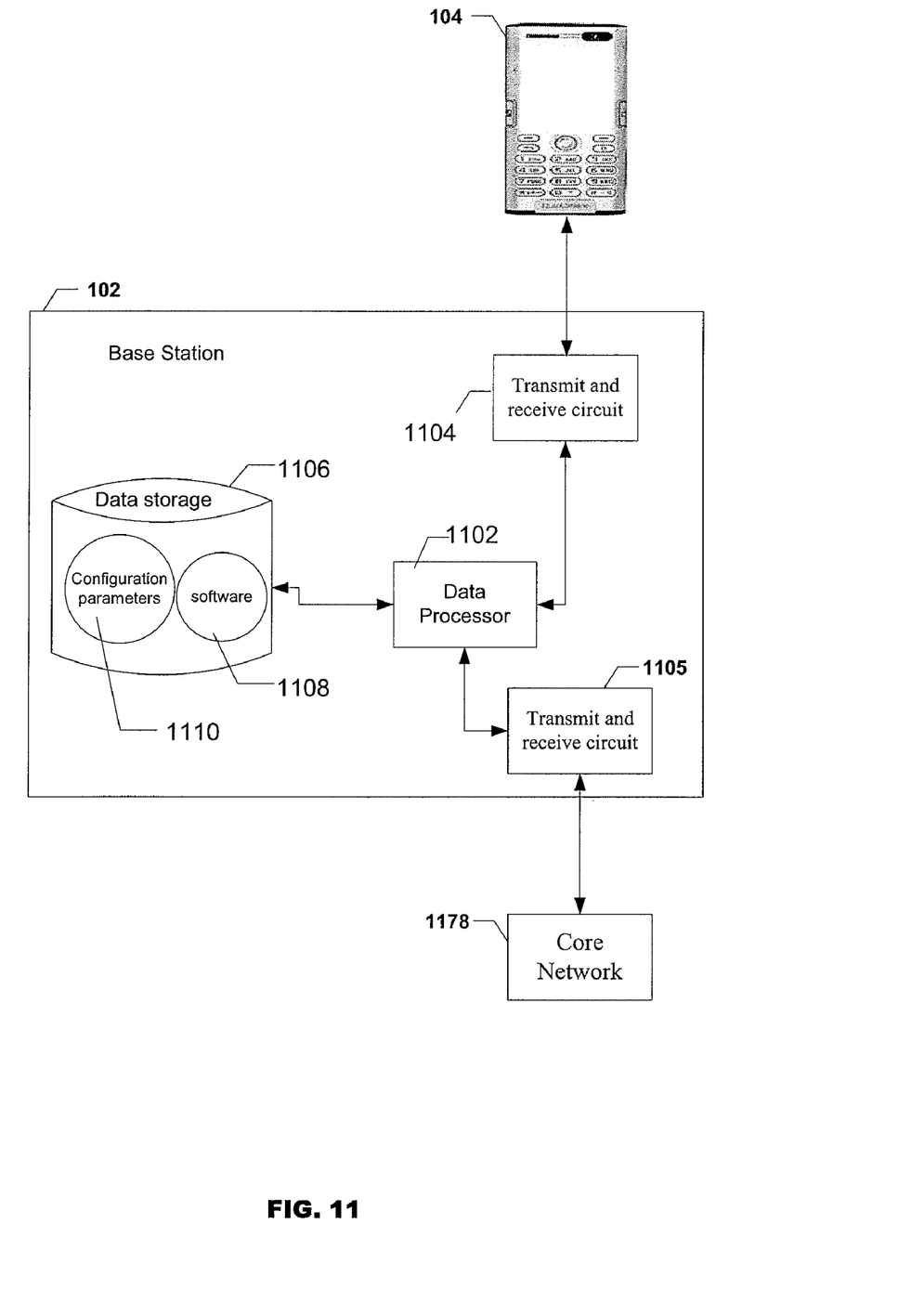
FIG. 11 is a functional block diagram of a base station according to some embodiments of the invention.

Referring now to FIG. 11, FIG. 11 is a functional block diagram of base station 102 according to some embodiments of the invention. As shown, base station 102 may comprise a data processing system 1102 (e.g., one or more microprocessors), a data storage system 1106 (e.g., one or more non-volatile storage devices) and computer software 1108 stored on the storage system 1106. Configuration parameters 1110 (e.g., the neighbor cell lists) may also be stored in storage system 1106. Base station 102 also includes transmit/receive (Tx/Rx) circuitry 1104 for transmitting data to and receiving data from UEs 104 and transmit/receive (Tx/Rx) circuitry 1105 for transmitting data to and receiving data from, for example, a core network node 1178.

Software 1108 is configured such that when processor 1102 executes software 1108, base station 102 performs steps described herein. For example, software 1108 may include: (1) computer instructions for determining whether a unique identifier associated with an unknown cell should be added to a neighbor cell list; (2) computer instructions for selecting a particular mobile terminal from a set of mobile terminals, wherein the computer instructions include instructions for determining which of the mobile terminals in the set appears to have the greatest probability of obtaining the unique identifier within a certain window of time and instructions for selecting that mobile terminal; (3) computer instructions for instructing the selected mobile terminal to obtain and report the unique identifier associated with the unknown cell; (4) computer instructions for receiving from the selected mobile terminal the unique identifier; and (5) computer instructions for adding the unique identifier to the neighbor cell list.

While various embodiments of the present invention have been described above, it should be understood that they have been presented by way of example only, and not limitation. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. In a network comprising a first base station serving a first cell and a second base station serving a second cell, a method for automatically adding a global cell identifier (GCI) associated with the second cell to a neighbor cell list associated with the first cell, the method comprising:

receiving, at the first base station, a message transmitted by a mobile terminal, the message comprising a physical layer cell identifier (PCI) associated with the second cell and/or cell quality information pertaining to the second cell;

after receiving the message, determining whether the GCI associated with the second cell should be added to the neighbor cell list associated with the first cell;

in response to determining that the GCI associated with the second cell should be added to the neighbor cell list, selecting a particular mobile terminal from a set of mobile terminals;

instructing the selected mobile terminal to obtain and report the GCI associated with the second cell;

receiving from the selected mobile terminal the GCI; and adding the GCI to the neighbor cell list, wherein the step of selecting the particular mobile terminal from the set of mobile terminals comprises determining which of the mobile terminals in the set appears to have a relatively high probability of obtaining the GCI within a certain window of time and selecting that mobile terminal.

2. The method of claim 1, wherein the step of determining whether the GCI associated with the second cell should be added to the neighbor cell list comprises determining whether a mobile terminal has transmitted to the first base station via the first cell a message containing the PCI associated with the second cell at least T1 times within a certain period of time, where T1 is a predetermined threshold parameter.

3. The method of claim 1, wherein the step of determining which of the mobile terminals in the set appears to have a relatively high probability of obtaining the GCI within the certain window of time comprises determining whether a mobile terminal included in the set has transmitted to the first base station via the first cell a message containing the PCI associated with the second cell at least T1 times within a certain period of time, where T1 is a predetermined threshold parameter.

4. The method of claim 1, wherein the step of determining whether the GCI associated with the second cell should be added to the neighbor cell list comprises determining whether the first base station has received via the first cell and within a certain period of time at least T3 messages containing the PCI associated with the second cell, where T3 is a predetermined threshold parameter.

5. The method of claim 4, wherein the step of determining which of the mobile terminals in the set appears to have a relatively high probability of obtaining the GCI within the certain window of time comprises determining the mobile terminal included in the set that, within the certain period of time, transmitted the greatest number of the messages containing the PCI associated with the second cell.

6. The method of claim 5, wherein the step of selecting from the set of mobile terminals the particular mobile terminal comprises selecting the mobile terminal that was determined to have transmitted, within the certain period of time, the greatest number of the messages containing the PCI associated with the second cell.

7. The method of claim 1, further comprising recording cell quality information regarding the second cell that was received from any of a plurality of mobile terminals within some particular period of time.

8. The method of claim 7, wherein the determination as to whether the GCI associated with the second cell should be added to the neighbor cell list is based, at least in part, on the recorded cell quality information.

9. The method of claim 8, wherein the step of determining which of the mobile terminals in the set appears to have a relatively high probability of obtaining the GCI within the certain window of time comprises determining the mobile terminal from the set that has reported the best cell quality information with respect to the second cell.

10. The method of claim 1, wherein the step of determining which of the mobile terminals in the set appears to have a relatively high probability of obtaining the GCI within the certain window of time comprises: determining a speed value indicating the speed at which a mobile terminal included in the set is moving; and/or determining a cell quality value pertaining to the second cell that was reported by a mobile terminal included in the set; and/or determining a propagation delay value that indicates the propagation delay between a mobile terminal included in the set and the second cell.

11. The method of claim 1, further comprising: acquiring the reference timing of the second cell; and using the acquired reference timing to schedule one or more gaps during which the particular mobile terminal should attempt to obtain the GCI associated with the second cell.

12. A base station serving a first cell, comprising:
a receiver operable to receive from a mobile terminal a message comprising a physical layer cell identifier (PCI) associated with a second cell served by a second base station and/or cell quality information pertaining to the second cell;
a transmitter;
a data processing system; and
a data storage system storing a set of computer instructions, the set of computer instructions being configured such that when executed by the data processing system the base station becomes operable to:
determine whether a global cell identifier (GCI) associated with the second cell should be added to a neighbor cell list associated with the first cell;
determine which of the mobile terminals in a set of mobile terminals appears to have a relatively high probability of obtaining the GCI within a certain window of time and select one of the determined mobile terminals in response to a determination that the GCI associated with the second cell should be added to the neighbor cell list;
use the transmitter to transmit to the selected mobile terminal a message instructing the selected mobile terminal to obtain and report the GCI associated with the second cell;
add the GCI to the neighbor cell list after the receiver receives from the selected mobile terminal the GCI.

13. The base station of claim 12, wherein the base station is configured such that, in determining whether the global cell identifier associated with the second cell should be added to the neighbor cell list, the base station determines whether a mobile terminal has transmitted to the base station via the first cell a message containing the PCI associated with the second cell at least T1 times within a certain period of time, where T1 is a predetermined threshold parameter.

14. The base station of claim 12, wherein the base station is configured such that, in determining whether the global cell identifier associated with the second cell should be added to the neighbor cell list, the base station determines whether the base station has received via the first cell and within a certain period of time at least T3 messages containing the PCI associated with the second cell, where T3 is a predetermined threshold parameter.

15. The base station of claim 14, wherein the base station is configured such that, in determining which of the mobile terminals in the set appears to have a relatively high probability of obtaining the global cell identifier within the certain window of time, the base station determines a mobile terminal included in the set that, within the certain period of time, transmitted the greatest number of the messages containing the PCI associated with the second cell.

16. The base station of claim 12, wherein the set of computer instructions comprises computer instructions for recording cell quality information regarding the second cell that was received from any of a plurality of mobile terminals within some particular period of time.

17. The base station of claim 16, wherein the base station is configured such that the base station takes into account the recorded cell quality information in determining whether the GCI associated with the second cell should be added to the neighbor cell list.

18. The base station of claim 17, wherein the base station is configured such that, in determining which of the mobile terminals in the set appears to have a relatively high probability of obtaining the GCI within the certain window of time, the base determines the mobile terminal from the set that has reported the best cell quality information with respect to the second cell.

19. The base station of claim 12, wherein the base station is configured such that, in determining which of the mobile terminals in the set appears to have a relatively high probability of obtaining the GCI within the certain window of time, the base station:
determines a speed value indicating the speed at which a mobile terminal included in the set is moving; and/or
determines a cell quality value pertaining to the second cell that was reported by a mobile terminal included in the set; and/or
determines a propagation delay value that indicates the propagation delay between a mobile terminal included in the set and the second cell.

20. The base station of claim 12, wherein the set of computer instructions further comprises:
 computer instructions configured such that when executed by the data processing system cause the base station to acquire the reference timing of the second cell; and
 computer instructions configured such that when executed by the data processing system cause the base station to use the acquired reference timing to schedule one or more gaps during which the particular mobile terminal should attempt to obtain the GCI associated with the second cell.

* * * * *

UNITED STATES PATENT AND TRADEMARK OFFICE
CERTIFICATE OF CORRECTION

PATENT NO.       : 8,041,353 B2                                            Page 1 of 1
APPLICATION NO.  : 12/349016
DATED            : October 18, 2011
INVENTOR(S)      : Kazmi et al.

It is certified that error appears in the above-identified patent and that said Letters Patent is hereby corrected as shown below:

In Column 8, Line 42, delete "the value" and insert -- the P value --, therefor.

In Column 8, Line 47, delete "the value" and insert -- the P value --, therefor.

Signed and Sealed this
Tenth Day of April, 2012

David J. Kappos
*Director of the United States Patent and Trademark Office*